Dec. 27, 1938.　　　D. A. MEEKER　　　2,141,311
FOOD HANDLING APPARATUS
Filed Feb. 13, 1935　　　3 Sheets—Sheet 1
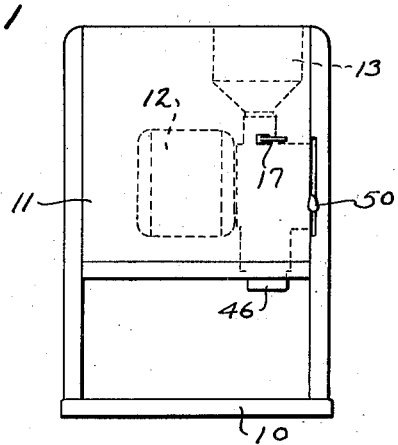
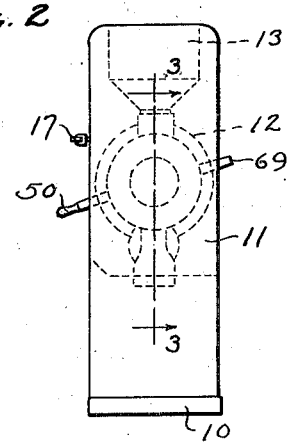
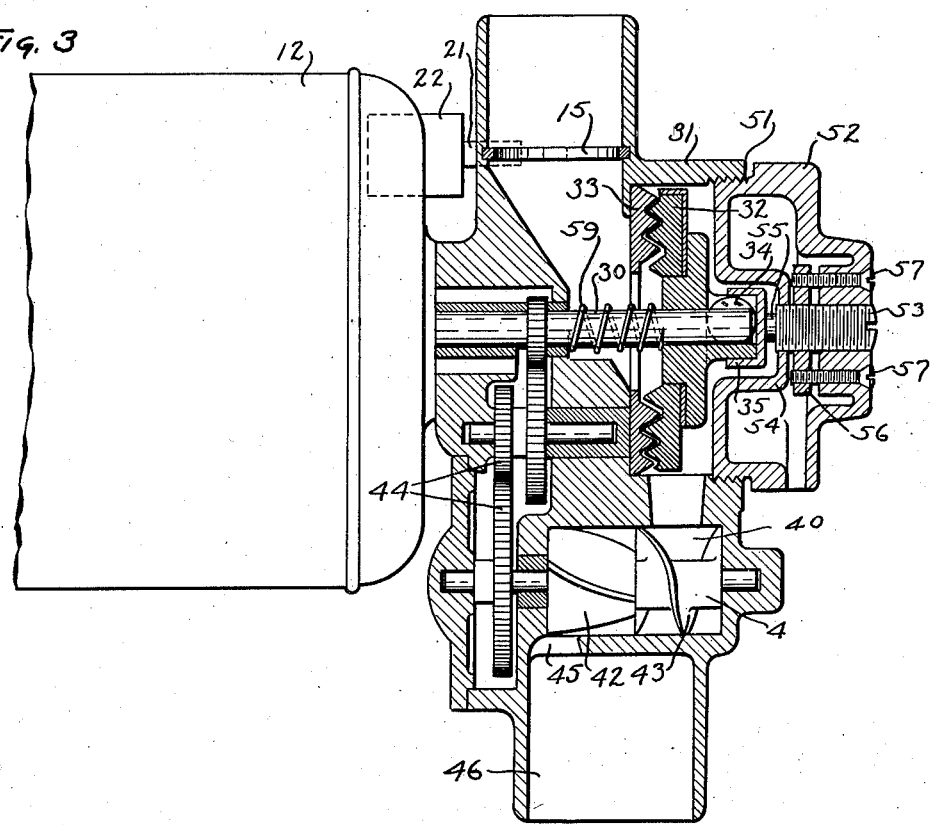
Inventor
David A. Meeker
By Marechal & Noe
Attorneys Dec. 27, 1938.   D. A. MEEKER   2,141,311
FOOD HANDLING APPARATUS
Filed Feb. 13, 1935   3 Sheets-Sheet 2
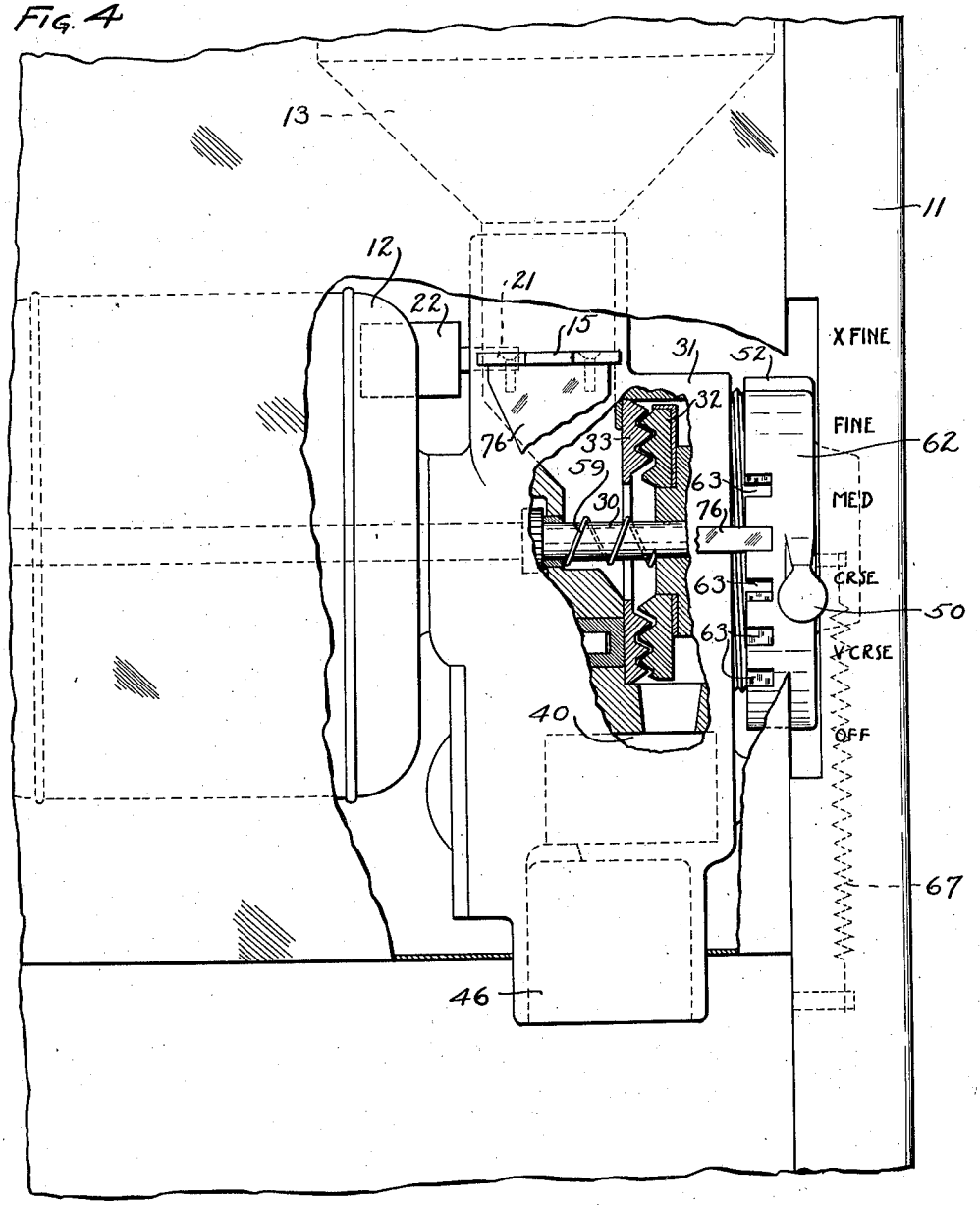

Dec. 27, 1938.  D. A. MEEKER  2,141,311
FOOD HANDLING APPARATUS
Filed Feb. 13, 1935  3 Sheets-Sheet 3
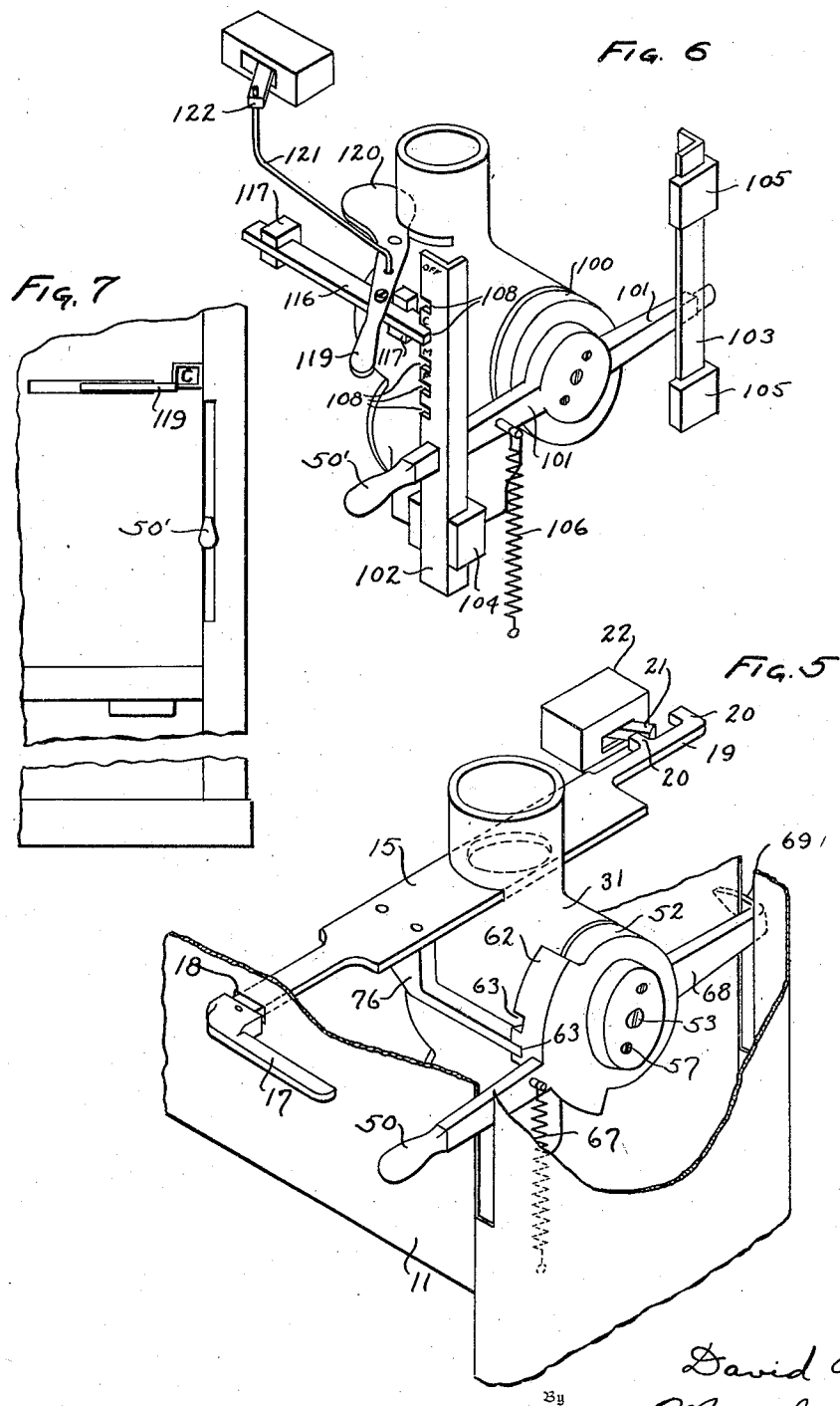
Inventor
David A. Meeker
By Marechal & Noe
Attorneys Patented Dec. 27, 1938

2,141,311

UNITED STATES PATENT OFFICE 2,141,311

FOOD HANDLING APPARATUS

David A. Meeker, Troy, Ohio, assignor to The Hobart Manufacturing Company, Troy, Ohio, a corporation of Ohio Application February 13, 1935, Serial No. 6,349

17 Claims. (Cl. 83—18)

This invention relates to food handling apparatus and more particularly to a coffee mill.

It is the principal object of the invention to provide a coffee mill of simple construction providing for a selection of the degree of fineness of grind for each operation and having means for intercontrolling the shut-off valve, motor and grade selecting mechanisms.

It is a further object to provide a coffee mill in which the grade selecting means is resiliently operated toward non-grinding position, is held in any predetermined grinding position during the grinding operation, and until the mill is turned off, when it is released and returned to non-grinding position.

Other objects and advantages will be apparent from the description, the accompanying drawings and the appended claims.

In the drawings,—

Fig. 1 is a view in side elevation of a coffee mill constructed in accordance with the present invention;

Fig. 2 is a view in end elevation;

Fig. 3 is a vertical sectional view as indicated by the line 3—3 of Fig. 2;

Fig. 4 is an enlarged fragmentary showing of Fig. 1 with parts broken away to show other parts in section;

Fig. 5 is a view in the nature of a perspective view showing the mechanism for operating and controlling the shut-off valve, the grade selector and the motor switch;

Fig. 6 is a similar view in the nature of a perspective showing a modified form of construction; and Fig. 7 is a fragmentary side elevational view of a coffee mill incorporating the mechanism of Fig. 6.

In the drawings, in which like characters of reference designate like parts throughout the several views thereof, the coffee mill is shown as comprising a base 10 upon which is mounted an enclosing housing or casing 11, generally rectangular in form and preferably enclosing the operating parts of the mill. The housing encloses certain of the usual elements of a coffee mill of this character, including a driving motor 12, a coffee receiving hopper 13 which extends upwardly to open through the top of the casing. For purposes of illustration the mill is shown as of the single-ended type, that is, comprising a single driving unit, a single hopper and a corresponding grinding means with suitable construction for effecting different grades of grind, and a single controlling and interconnecting mechanism. However, as is well known, the mill could be of the so-called double-end construction, in which event the casing would be enlarged, the motor 12 would be provided with shafts extending in opposite directions and the grinding, coffee feeding, interconnecting and controlling mechanism would be provided at each end, with the control mechanisms either independently operable upon the grade selector, etc., and the motor, or interconnected to have a conjoint controlling effect upon the motor, for example as shown in the companion application of Herbert L. Johnston filed of even date herewith, now Patent No. 2,060,807.

The hopper is provided with a control gate 15 adapted to control the passage of coffee from the hopper into the grinding burrs. As shown this gate is slidably mounted within a suitable slot or opening in the discharge passage from the hopper, and at one end it has an operating handle 17 which is shown as horizontally positioned and extending through a horizontally arranged slot 18 in the wall of the mill casing. As shown this handle 17 extends through the operator's side of the casing of the mill in such position as to be readily accessible for operation. The opposite end of this slide member has an extension 19 provided with spaced actuating members 20 which receive between them the lever or operating handle 21 of the motor switch 22. As shown this control gate 15 is provided with an opening, which is adapted to register with the discharge passage from the hopper, the arrangement being such that when the gate is moved or slid to bring the passage into register with the discharge passage of the hopper, coffee to be ground will pass downwardly into the grinding burrs, and when the gate is moved to other positions the passage will be moved out of alignment with the discharge passage of the hopper and a solid portion of the gate will then be positioned across the passage to block that passage and prevent flow of coffee into the burrs. As shown the construction is such that as the gate 15 is moved by the operator to permit coffee to flow down into the burrs the movement of the extension 19 will cause corresponding movement of the motor switch to close that switch and start operation of the motor.

The motor shaft 30 extends in overhanging relation into the grinding mechanism and serves as a support for the rotary grinding burr 32 which cooperates with the fixed grinding burr 33. The rotary burr is splined on the shaft 30 by means of the key 34, held in place by an end bearing member 35. This construction provides for the axial movement of the burr 32 toward and away from the fixed burr 33 to provide for adjusting the degree of fineness of the grind, and as shown the housing containing the burrs is positioned to receive coffee to be ground from the hopper, when the gate 15 is moved to such position as to permit the coffee to flow into the burrs.

The coffee having been ground passes into a discharge passage 40 in which has been positioned a screw feed 41. This screw feed mechanism is preferably provided with a feed conveyor mechanism providing for mixing and positive feed of the ground material resulting in a packing and frictional rubbing contact of the ground coffee in the discharge passage to prevent the blowing of the coffee out of the passage by the air currents generated during the grinding operation, and also to dissipate the electrostatic charge set up upon the coffee and chaff during the grinding operation and to intimately admix the ground coffee and the chaff. This screw conveyor 41 is preferably provided with a worm portion 42, and conveyor ribs 43 which are of less pitch and which serve as an additional agitating means. The screw conveyor is operated by suitable reduction gearing indicated generally by the numeral 44, which in turn is driven from the motor shaft 30. The ground coffee having been fed by this screw conveyor is discharged through the opening 45 and out through the discharge outlet 46 to be received within a suitable container, which may be preferably the same container which held the coffee in bean form before it was ground.

Means are provided for selecting the grade of fineness to which the coffee may be ground. This means comprises the casing 52 which has threaded engagement at 51 with the frame member 31. The casing carries an operating handle 50, which is extended rearwardly, through a slot in the housing into position to be conventiontly manipuated by the operator. The casing 52 has a central opening in which is positioned a threaded member 53 which is guided at its inner end by an inwardly projecting flange 54 formed integrally with the casing member. The screw 53 is adapted to be adjusted axially with respect to the casing member and at its inner end carries a thrust member 55 adapted to bear against the end of the cup-shaped member 35 to transmit axial thrust to the rotary burr and thereby to effect its spacing from the fixed burr. A locking disk 56 is threadedly mounted upon the screw 53 and upon the tightening of screws 57 the screw 53 will be locked in any position with respect to the casing 52, to thus permit adjustment relative to the grade selector indications.

The grade selector means has a non-grinding position in which the burrs have maximum spacing from each other, and a plurality of grinding positions, of varying degrees of fineness, which are reached as the handle 50 is moved upwardly from the non-grinding position. As shown in Fig. 4, the closing housing, adjacent the slot through which the handle 50 projects, is provided with a series of indications, "off", etc., which correspond to the predetermined settings arranged to be secured by operation of the handle. As the upward movement of the handle effects rotation of the casing 52, and consequent axial movement in the screw threads 51, this also causes movement of the screw 53 axially to move the rotary burr 32 toward the fixed burr until this continued movement of the handle brings the rotary burr into the position of fineness grind. Surrounding the motor shaft is a spring 59, which urges the rotary burr away from the fixed burr, to open up the setting, when the operating handle is moved downwardly toward coarse settings and ultimately to off position. This spring also serves as a feeding means to cause more uniform and positive travel of the coffee into the grinding space within the burrs.

A sector-shaped member 62 is attached to the casing 52, and carries the operating handle 50. This sector-shaped member 62 is provided with a plurality of radially extending grooves or slots 63 which are spaced distances apart corresponding to varying gradations of grinding. These slots correspond to the indication markings above referred to in which, the letters F, M and C refer to fine, medium and coarse, respectively. A spring 67 is attached to the arm 50 at one end by hooking over a lug or pin carried by said arm, the other end of the spring being attached to a fixed pin, the tension of the spring thus at all times tending to cause rotation of the arm toward the off or non-grinding position. Extending in the opposite direction from the arm 50 is an arm 68 which extends through a slot in the customer's side of the mill housing and which carries a pointer 69 on its outer end, which, as the grade selector is operated, moves into indicating relation with a corresponding set of grade selector indications,—this arrangement being such that the handle 50 and the pointer 69 give the same fineness indications to the clerk and the customer respectively.

Extending downwardly and laterally from the gate or valve 15 is a latch member or interlocking arm 76 which is adapted to be moved into and out of the several slots 63, when the sector 62 is in proper angular setting. This construction is such that with the sector member held in proper position by the handle 50, the gate or valve 15 can be moved to bring the opening therein into registry with the feeding passage in the opening, the extension or interlock arm 76 moving, during such operation, into one or the other of the slots, according to the positioning of the grade selector mechanism.

At the beginning of the operation of the mill the grade selector being in its non-grinding position, with the gate pulled out to close the passage from the hopper, and with the arm 50 in its lowermost position under the action of the spring, the interlock arm is at that time opposite the portion of the sector above the slots. In this position, the gate cannot be moved to open the passage from the hopper or to actuate the motor switch to a closed position. When it is desired to operate the handle 50 is moved upwardly to effect adjustment of the rotary burr with respect to the fixed burr, the setting being determined by the relative positioning of the arm 50 with respect to its associated indications. While the handle is held in the selected position of grind, the control handle 17 is moved inwardly to open the passage from the hopper, to throw the motor switch to closed position, and at the same time to bring the interlock arm 76 into the slot on the sector corresponding to that particular positioning. When in this position the motor cannot be stopped except by moving the handle 17 in the opposite direction, and in order to move it sufficiently to throw the motor switch to open position, the interlock arm 76 is moved out of the slot in which it is positioned at that time. As soon as the interlock arm is moved out of its cooperating slot, its resistance to the turning of the grade selecting mechanism under the action of the spring is withdrawn, and the spring thereupon rotates the arm 50 to off position, at the same time moving the burrs to wide-open position, and bringing the non-slotted portion of the sector opposite the interlock arm so that the mill may not be started again until the arm 50 is moved upwardly to permit inward movement of the handle 17.

Fig. 6 shows a modified form of construction in which the grade disk 100 similarly corresponds to the casing 52 and is adapted to effect the spacing of the burrs in the same manner as above described, upon being rotated upon its axis, in which rotation is effected by means of the crossbar 101 which extends at its opposite ends into openings in a pair of vertically arranged slide bars 102—103. Each of these bars has a slot receiving the adjacent portion of the crossbar, each slot sufficiently large to permit movement of the crossbar with reference to each of these vertical slide bars as such rotation takes place. Suitable guiding means 104—105 are provided to guide the slides in a substantially vertical path. Spring means 106 is arranged under tension to normally rock the crossbar to cause downward movement of slide 102 with corresponding upward movement of 103, which movement causes adjustment of the grade selector means towards off or non-grinding position. Slide 102 is provided with notches 108, and is adapted to receive an interlocking arm or latch 116 which slides in suitable guideways 117. This latch is pivotally connected to a suitable handle 119, which is pivotally mounted and forms an extension of the gate 120, the arrangement being such that by swinging the arm 119 about its pivot the gate will be swung to open or close the passage from the hopper to the burrs. This arm 119 has connected thereto a link 121 which is in turn connected at its other end to the motor switch 122, so that as the arm moves from one position to the other the motor switch is opened or closed. The vertical bar 102 carries a series of indications,—"off" F, M, C, etc., upon the portion interposed between the slots which receive the interlock member 116. And the casing, in this modification, has an opening positioned so that these indications may be viewed through this opening when the vertical bar is in any one of the fixed grade selector positions. This is shown in Fig. 7; and the opposite or customer's side of the housing can likewise be provided with an opening and indicating means on the bar 103. This arrangement has the advantage that no indication appears except when the grade selector means is properly adjusted to some one of the grading positions.

In this form of construction, as in that described above, the gate is held against opening movement when the operating handle 50' of the cross bar 101 is in the lowermost or off position, and can be moved to open position and to close the motor switch only when the operating handle 50' has been elevated to bring some one of the slots in the bar 102 into position to receive the end of the interlock member 116. And when the handle 119 is moved to open the motor switch, the grade selecting mechanism is automatically returned to the off or non-grinding position by means of the spring.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A coffee mill of the character described comprising grinding burrs, a motor for operating one of said burrs to effect a grinding operation, grade selector means for said grinding burrs adjustable from a non-grinding position to a plurality of grinding positions, means effective to move said grade selector means to non-grinding position, means for releasably holding said grade selector means in any predetermined grinding position, motor control means, and means operative in response to actuation of said motor control means to stop the motor for releasing said holding means to provide for the return of said grade selector means to non-grinding position under the action of said moving means.

2. A coffee mill of the character described comprising a motor, grinding means driven by said motor, grade selector means for said grinding means adjustable from a non-grinding position to a plurality of grinding positions, resilient means effective to move said grade selector means to non-grinding position, releasable means for retaining said grade selector means in any selected grinding position, means for controlling the grinding operation of said mill, and means effective in response to operation of said control means to terminate the grinding operation for operating said releasable means to provide for return of said grade selector means to its non-grinding position.

3. A coffee mill of the character described comprising a motor, grinding means driven by said motor, grade selector means for said grinding means adjustable from a non-grinding position to a plurality of grinding positions, means tending to move said grade selector means to non-grinding position, releasable means for retaining said grade selector means in any selected grinding position, means for controlling the starting and the stopping of the grinding operation, means preventing the operation of said control means to start the grinding operation except when said grade selector means has been adjusted to a grinding position, and means effective in response to operation of said control means to stop the grinding operation to release said retaining means for said grade selector means to allow said grade selector means to return to said non-grinding position.

4. A coffee mill of the character described comprising motive means, control means therefor, grinding means driven by said motive means, grade selector means for said grinding means adjustable from a non-grinding position to a plurality of grinding positions, resilient means effective to move said grade selector means to said non-grinding position, releasable means for retaining said grade selector means in any predetermined grinding position, a gate for controlling the admission of coffee to said mill, means preventing the opening of said gate except when said grade selector means has been adjusted to a grinding position, and means operable in response to closing said gate for actuating said releasable means to provide for return of the grade selector means to its non-grinding position.

5. A coffee mill of the character described comprising a motor, switch means therefor, grinding means driven by said motor, grade selector means for said grinding means adjustable from a non-grinding position to a plurality of grinding positions, resilient means effective to move said grade selector means to said non-grinding position, means for retaining said grade selector means in any predetermined grinding position, a gate controlling the supplying of coffee to said grinding means, and means associated with said retaining means providing for movement of said gate to open position and of said switch to circuit closed position concomitantly with movement of said retaining means to position to retain the grade selector means in a grinding position.

6. A coffee mill of the character described comprising a motor, grinding means driven by said motor, grade selector means for said grinding means adjustable from a non-grinding position to a plurality of grinding positions, means tending to move said grade selector means to said non-grinding position, releasable means for retaining said grade selector means in any predetermined grinding position, control means for said motor, means effective in response to operation of said control means to stop the motor to release said retaining means for said grade selector means to allow said grade selector means to return to said non-grinding position, and means preventing the subsequent operation of said control means to start the motor except when said grade selector means has been adjusted to a grinding position.

7. A coffee mill of the character described comprising a motor, grinding means driven thereby, grade selector means for said grinding means adjustable from a non-grinding position to a plurality of grinding positions, means effective to move said grade selector means to said non-grinding position, releasable means for retaining said grade selector means in any predetermined position, a gate for controlling admission of coffee to said mill, manually operable means for actuating said gate, and means operable in response to actuation of said manually operable means to close said gate for releasing said retaining means to provide for return of said grade selector means to non-grinding position under the action of said moving means.

8. A coffee mill of the character described comprising a motor, control means therefor, grinding means driven by said motor, grade selector means for said grinding means adjustable from a non-grinding position to a plurality of grinding positions, means tending to move said grade selector means to said non-grinding position, releasable means for retaining said grade selector means in any predetermined grinding position, a gate for controlling admission of coffee to said mill, means preventing the opening of said gate except when said grade selector means is in a grinding position, and means operable in response to closing of said gate for releasing said retaining means to allow said grade selector means to return to non-grinding position.

9. A coffee mill of the character described comprising a motor, grinding means driven by said motor, grade selector means for said grinding means adjustable from a non-grinding position to a plurality of grinding positions, a motor switch, a hopper for receiving coffee to be ground and supplying it to said grinding means, a gate for said hopper, means for closing said motor switch and for opening said hopper, means tending to move said grade selector mechanism to its non-grinding position, and interlocking means cooperating with said motor and said gate means for retaining said grade selector means in a predetermined adjusted position including a grooved member movable with said grade selector means, and an interlocking finger adapted to engage a selected groove when said motor control means and said gate means is moved to its on position, thereby retaining said grade selector means in a predetermined adjusted position.

10. A coffee mill of the character described comprising a motor, grinding means driven by said motor, grade selector means for said grinding means adjustable from a non-grinding position to a plurality of grinding positions, a motor switch, a hopper for receiving coffee to be ground and supplying it to said grinding means, a gate for said hopper, means for closing said motor switch and for opening said hopper, means tending to move said grade selector mechanism to its non-grinding position, and interlocking means cooperating with said motor and said gate means for retaining said grade selector means in a predetermined adjusted position including a grooved member movable with said grade selector means, and an interlocking finger carried by said gate and adapted to engage a selected groove when said motor control means and said gate means is moved to its on position, thereby retaining said grade selector means in a predetermined adjusted position.

11. A coffee mill of the character described comprising a motor, grinding means driven by said motor, grade selector means for said grinding means adjustable from a non-grinding position to a plurality of grinding positions, a motor switch, a hopper for receiving coffee to be ground and supplying it to said grinding means, a gate for said hopper, means for closing said motor switch and for opening said hopper, means tending to move said grade selector mechanism to its non-grinding position, and interlocking means cooperating with said motor and said gate means for retaining said grade selector means in a predetermined adjusted position including a grooved segment member rotatably movable with said grade selector means, and an interlocking finger adapted to engage a selected groove when said motor control means and said gate means is moved to its on position, thereby retaining said grade selector means in a predetermined adjusted position.

12. A coffee mill of the character described comprising a motor, grinding means driven by said motor, grade selector means for said grinding means adjustable from a non-grinding position to a plurality of grinding positions, a motor switch, a hopper for receiving coffee to be ground and supplying it to said grinding means, a gate for said hopper, means for closing said motor switch and for opening said hopper, means tending to move said grade selector mechanism to its non-grinding position, and interlocking means cooperating with said motor and said gate means for retaining said grade selector means in a predetermined adjusted position including a grooved bar member movable with said grade selector means, and an interlocking finger adapted to engage a selected groove when said motor control means and said gate means is moved to its on position, thereby retaining said grade selector means in a predetermined adjusted position.

13. A coffee mill of the character described comprising a motor, grinding means driven by said motor, grade selector means for said grinding means adjustable from a non-grinding position to a plurality of grinding positions, a motor switch, a hopper for receiving coffee to be ground and supplying it to said grinding means, a gate for said hopper, means for closing said motor switch and for opening said hopper, means tending to move said grade selector mechanism to its non-grinding position, and interlocking means cooperating with said motor and said gate means for retaining said grade selector means in a predetermined adjusted position including a plurality of bars movable with said grade selector means one of said bars having selector means, and an interlocking finger adapted to engage a selected groove when said motor control means and said gate means is moved to its on position, thereby retaining said grade selector means in a predetermined adjusted position.

14. A coffee mill of the character described comprising a hopper for receiving the coffee, grinding means, gate means for controlling the admission of coffee from said hopper to said grinding means, a motor for operating said grinding means, control means for said motor, grade selector means for said grinding means adjustable from a non-grinding position to a plurality of grinding positions, yieldable means tending to move said grade selector means to said non-grinding position, latching means for preventing the return of said grade selector means from any predetermined grinding position to said non-grinding position, means preventing the operation of said gate means to admit coffee to said grinding means except when said grade selector means has been adjusted to a grinding position, and means operative upon a subsequent operation of the gate to closed position for releasing said latching means to permit the return of said grade selector means to the off position under the action of said yieldable means.

15. In a coffee mill provided with a motor, grinding means driven by said motor, grade selector means for said grinding means adjustable from a non-grinding position to a plurality of grinding positions, means tending to move said grade selector means to non-grinding position and a gate for controlling the admission of coffee into said grinding means; means effective in controlling the operation of said mill comprising a bar movable with said grade selector means and having a plurality of notches corresponding to the grinding positions and an unnotched portion corresponding to said non-grinding position, and an interlocking arm movable with the motor switch and said gate into cooperative position with said bar, said interlocking arm being adapted to engage within a selected notch in said bar when the motor switch is turned on and the gate opened to retain said grade selector mechanism in a selected grinding position, said unnotched portion of said bar in conjunction with said interlocking arm preventing the actuation of said motor switch to on position and the opening of said gate when grade selector is in non-grinding position.

16. A coffee mill of the character described which comprises a housing, a motor, grinding means driven by said motor, said motor and said grinding means being located within said housing, grade selector means for said grinding means adjustable from a non-grinding position to a plurality of grinding positions of varying grades of fineness, means operative to return said grade selector means from a grinding position to the non-grinding position thereof, releasable retaining means enclosed within said housing for preventing operation of said returning means and adapted to hold said grade selector means in a predetermined grinding position, means enclosed within said housing for controlling the grinding operation of the mill, and a manually operable member accessible from the exterior of said housing for effecting concomitant operation of said releasable retaining means and of said controlling means to cause return of said grade selector means to non-grinding position and to terminate the grinding operation of said mill.

17. A coffee mill of the character described which comprises a motor, grinding means driven by said motor, grade selector means for said grinding means adjustable from a non-grinding position to a plurality of grinding positions of varying grades of fineness, means operative to return said grade selector means from a grinding position to the non-grinding position thereof, retaining means for preventing operation of said returning means and adapted to hold said grade selector means in a predetermined grinding position, means for controlling the grinding of coffee, and means operable in response to actuation of said controlling means to stop the grinding of coffee for releasing said retaining means to provide for the return of said grade selector means to the non-grinding position thereof.

DAVID A. MEEKER.